Dec. 31, 1946.   W. D. SWALLOW   2,413,340
TORSIONAL VIBRATORY ELECTRIC MOTOR
Filed March 23, 1944   3 Sheets-Sheet 1
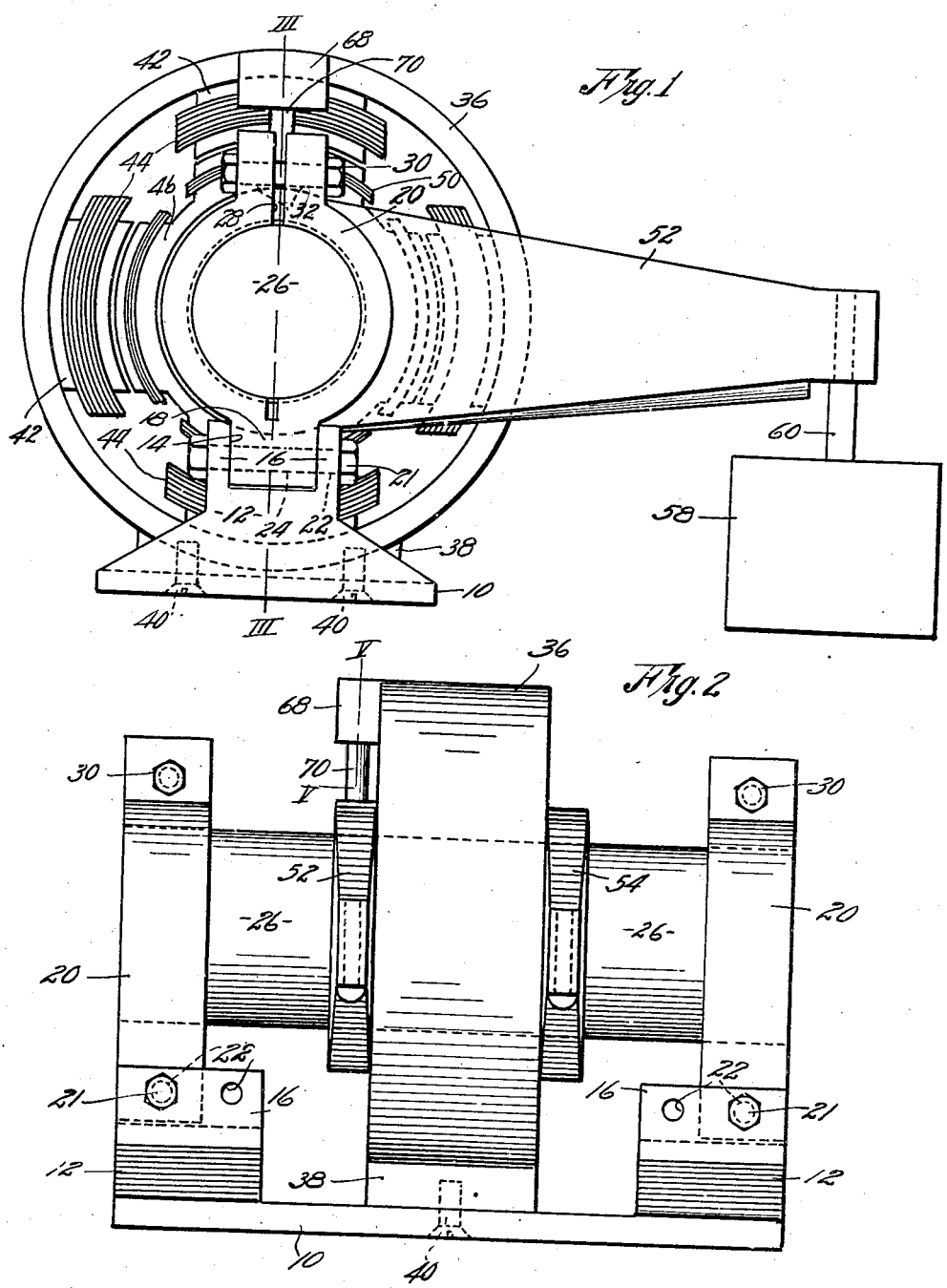
INVENTOR,
William Duncan Swallow.
BY
Roy E. Hamilton
Attorney.

Dec. 31, 1946.  W. D. SWALLOW  2,413,340
TORSIONAL VIBRATORY ELECTRIC MOTOR
Filed March 23, 1944  3 Sheets-Sheet 2

INVENTOR,
William Duncan Swallow.
BY
Roy E. Hamilton,
Attorney.

Dec. 31, 1946.   W. D. SWALLOW   2,413,340
TORSIONAL VIBRATORY ELECTRIC MOTOR
Filed March 23, 1944   3 Sheets-Sheet 3
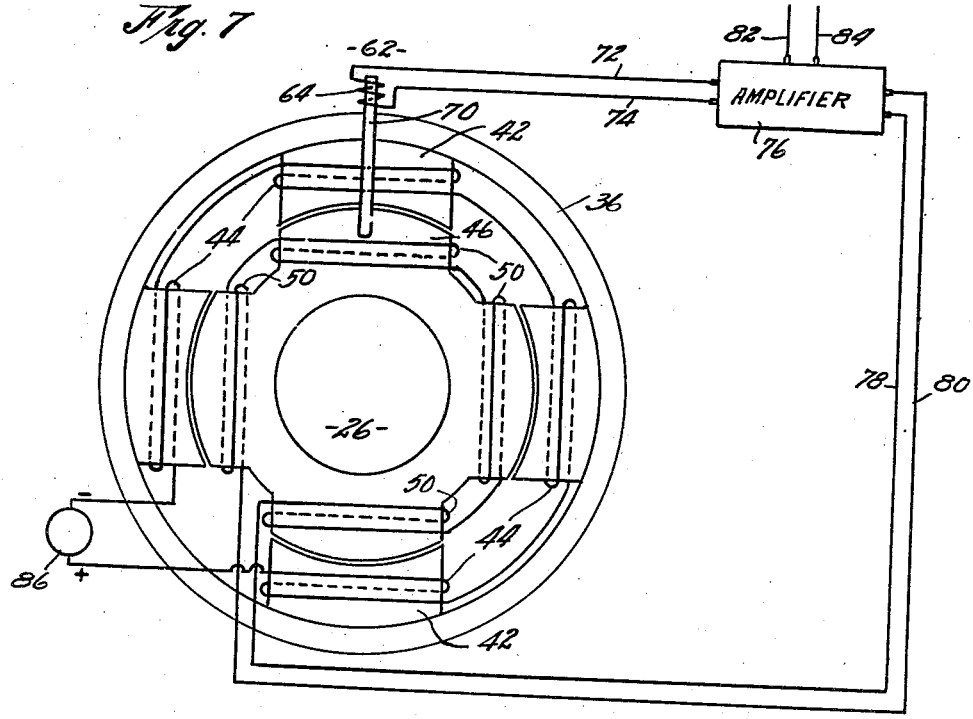
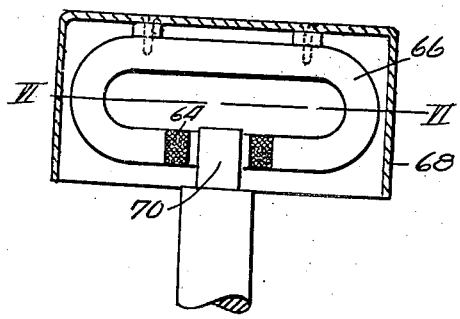
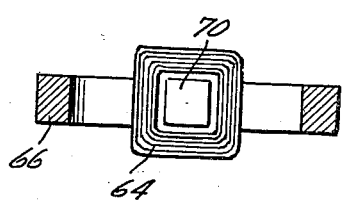
INVENTOR.
William Duncan Swallow.
BY Roy E. Hamilton
Attorney.

Patented Dec. 31, 1946

2,413,340

UNITED STATES PATENT OFFICE 2,413,340

TORSIONAL VIBRATORY ELECTRIC MOTOR

William Duncan Swallow, Los Angeles, Calif., assignor of two-thirds to Herbert E. Pelton and George S. Pelton, both of Los Angeles, Calif.

Application March 23, 1944, Serial No. 527,813

9 Claims. (Cl. 172—126)

This invention relates to improvements in torsional vibratory electric motors and has for its principal object the production of a torsional electric motor having an element to be moved which controls an electric means to regulate the current frequency of said motor. This is an improvement over my Electrical reciprocating motor, Patent No. 2,297,084, issued September 29, 1942.

Another object of the present invention is the production of a torsional electric motor whereby vibratory movement is imparted to a mass by an oscillatory movement of the motor.

A further object of the invention is the provision of an electric motor having a torsional vibratory member of predetermined frequency of vibration to which an element of variable mass is connected for to and fro movement therewith, and electrical means operable in conjunction with said torsional vibratory member to effect movement of said element of variable mass.

Another object is the provision of an electric motor having a torsional vibratory member secured at its opposite end against torsional movement, and electro-reactive means whereby the central portion of the vibratory member is caused to torsionally vibrate, and electric means controlled by the frequency of vibration of said torsional vibratory member whereby the electro-reactive means is maintained in synchronism with the vibratory movement of said torsional vibratory member.

With these objects in view, as well as other objects which will appear during the course of the specification, reference will now be had to the drawings wherein:

Fig. 1 is a side elevational view of a torsional vibratory electric motor embodying this invention.

Fig. 2 is a front elevational view of the motor.

Fig. 5 is an enlarged sectional view taken on line V—V of Fig. 2.

Fig. 6 is a sectional view taken on line VI—VI of Fig. 5.

Fig. 7 is a diagrammatic view of the electric circuit of said motor.

Figure 3:
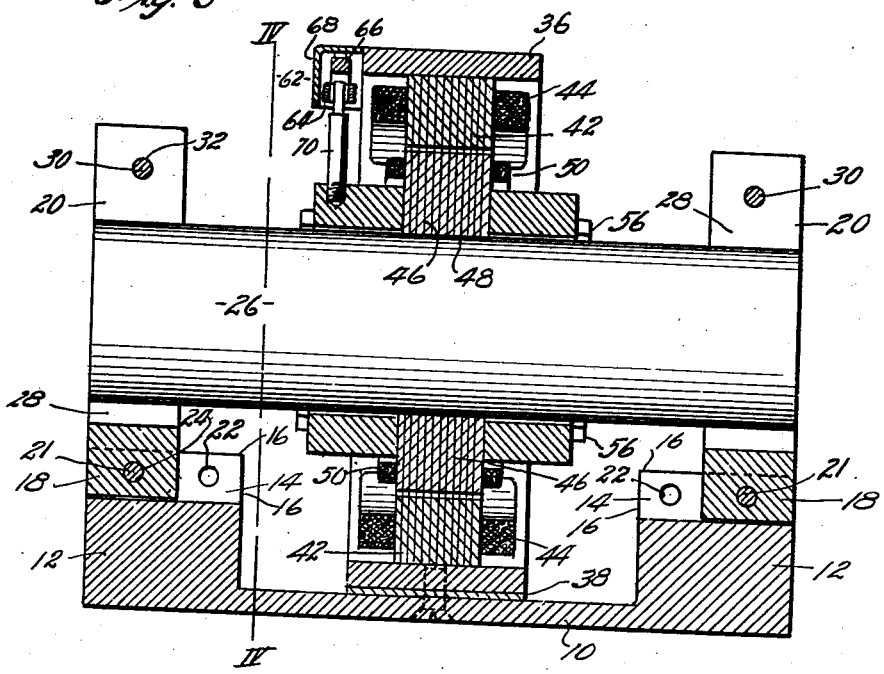
Fig. 3 is a central sectional view of the motor taken on line III—III of Fig. 1.
Figure 4:
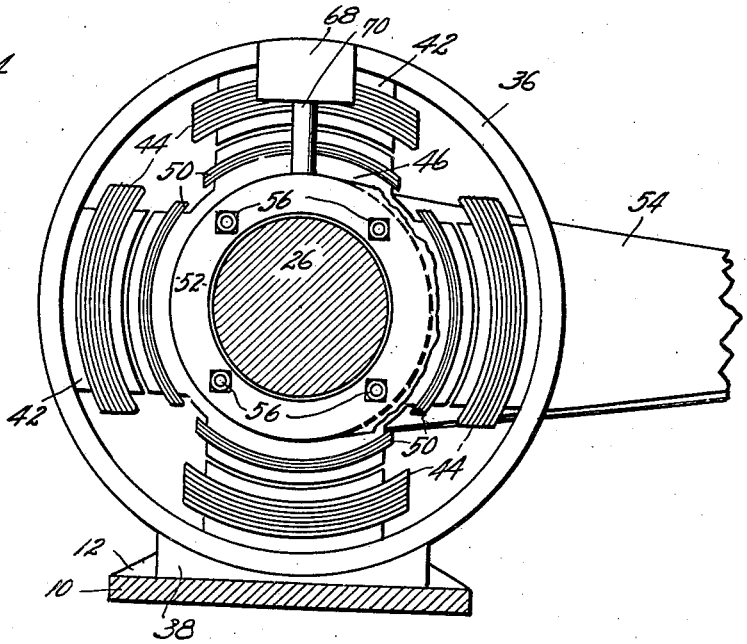
Fig. 4 is a sectional view taken on line IV—IV of Fig. 3.

Throughout the several views like reference characters refer to similar parts and the numeral 10 designates a motor base which is adapted to be fixed to anchoring means, not shown, whereby the vibratory parts will function properly.

Opposite end portions of base 10 are provided with integral blocks 12 which are grooved at 14 to present walls 16 between which the depending bases 18 of clamps 20 are adapted to snugly fit. Each clamp is rigidly held in position relative to the base by means of bolts 21 which pass through holes 22 and 24 formed through the walls 16 and clamp base 18 respectively. A plurality of holes 22 are provided in walls 16 so as to permit axial adjustment of the clamps 20 toward and from each other.

A torsional spring or torsional vibratory member 26 is mounted with its end portions fixed in the spaced apart clamps 20 so as to normally preclude any movement of the end portions of member 26 relative to the base 10. The frequency and amplitude of oscillatory movement of that portion of member 26 between clamps 20 may be varied by adjusting the clamps toward and from each other. Since clamps 20 are independently adjustable, it is quite apparent that one clamp may be adjusted to make rigid one end of member 26 while the other end thereof is permitted to oscillate in the other clamp member. When so anchored, the free end of member 26 may be rigidly attached directly to a load such as a structural member to be vibrated.

It will be noted that clamps 20 are split at 28 to permit a limited opening and closing of the clamp sections against the member 26. Bolts 30 passing through holes 32 formed in the free extremities of the clamp are adjustable to cause a secure gripping of the torsional member 26 or to permit its free movement therein.

In the motor shown, it will be observed that the field winding is stationary, while the armature windings are movable. The field windings 44 are carried by the ring-shaped motor case 36 which is nested in the adapter plate 38 and secured to the base plate 10 by means of machine screws 40. The torsional member 26 is cylindrical in form and when mounted in clamps 20 is in axial alignment with the ring motor case 36.

Cores 42 are laminated and carry the field coils 44, as clearly shown in Figs. 1 and 3. The armature core 46 is rigidly secured to torsional spring member 26 at 48 and carries the armature coils 50. This armature core 46 is centrally positioned between the clamp members 20, thus insuring equal torsional movements of the member 26 at both sides of its driving unit. In Fig. 5, the armature is shown in the neutral position with respect to the field. This position may be varied to conform with requirements at different frequencies and amplitudes.

Rocker arms 52 and 54 positioned respectively at opposite sides of the motor are fastened directly to the armature by means of bolts 56 and extend radially therefrom in substantially parallel relation to receive a mass 58 which is secured to said arms by member 60. The distance of the support of the mass from the axis of oscillation may be of any desired length to produce the desired amplitude of vibration. When the clamps 20 are set tightly against member 26 only that portion of 26 intermediate said clamp members is permitted to oscillate. This oscillatable portion of the torsion spring member will move at its fixed resonant period when power is applied. Furthermore, by changing the distance between the clamps, the amplitude and frequency of oscillation may be varied.

An electric pick-up or generating device 62 comprises a stationary coil 64 which is carried by magnet 66, attached to housing 68 which in turn is secured to the motor case 36. A soft iron rod 70 secured to oscillate with armature 46 moves in coil 64 to generate a current therein in synchronism with the movement of said armature.

Reference will now be had to Fig. 7 showing a typical circuit whereby this motor is operated. Obviously, there are many ways of winding this motor. In the present showing, the field is stationary and the armature windings are movable. This arrangement might be reversed, also it would be possible to have both windings stationary and the armature consisting only of a short-circuited copper bar similar to the arrangement used in the induction motor. The principal requirement of the circuit is to obtain a resonance operation by means of the feed back circuit. The coil 64 is connected by wires 72 and 74 to the audio frequency amplifier 76. The output power stage is connected by wires 78 and 80 to the armature coils 50 which are connected in series. Amplifier feed wires 82 and 84 are connected with a suitable electric power source, not shown. Generator 86 in series with the field windings 44 serves to excite these coils.

By means of this structure and electrical hook up, it is quite apparent that the electro-reactive means operable to cause a torsional vibratory movement of that portion of the torsional vibratory member between the clamps will be maintained in synchronism with the oscillatory movement of the torsional vibratory member due to the electric pick-up controlled thereby.

This electric torsional vibratory motor provides for an electro-reactive means suitable for imparting a torsional to and fro movement to a torsional vibratory member of predetermined frequency which in turn controls an electric pick-up or generator which serves to control the frequency of current from an electric power feed source to said electro-reactive driving means whereby the frequency of the current to said electro-reactive driving means is maintained in synchronism with the vibratory movement of the torsional vibratory member at all times.

It is evident from the foregoing description that many minor changes might be made both in the general structure of the motor and the controlling electric circuit without departing from the spirit of the invention.

Having thus described the invention, what I claim as new and desire to be secured by Letters Patent is:

1. A torsional electric motor adapted to vibrate a variable load, which includes: a cylindrical torsion rod; means adjustable along the length of said torsion rod for clamping each end thereof in fixed position whereby the central portion of said rod can be twisted; a rocker arm fixed to the central portion of said torsion rod and adapted to be connected to a load to be vibrated; an electro-reactive member surrounding the central portion of said torsion rod and movable therewith; a stationary electro-reactive member surrounding said first electro-reactive member and adapted to cooperate therewith to twist said torsion rod when current is supplied to said electro-reactive members; an audio frequency amplifier with its output connected to one of said electro-reactive members to supply a power current thereto; current generating means operable by the oscillations of said torsion rod to generate a current whose frequency is determined by the frequency of vibration of said torsion rod; and means connecting said generating means to said amplifier whereby said generated current will control the frequency of said power current to thereby synchronize the same with the frequency of vibration of said torsion rod.

2. A torsional electric motor adapted to vibrate a variable load, which includes: a cylindrical torsion member; means adjustable along the length of said torsion member for clamping an end thereof in fixed position whereby said member can be twisted; a rocker arm fixed to said torsion member and adapted to be connected to a load to be vibrated; an electro-reactive member surrounding said torsion member and movable therewith; a stationary electro-reactive member surrounding said first electro-reactive member and adapted to cooperate therewith to twist said torsion member when current is supplied to said electro-reactive members; an audio frequency amplifier with its output connected to one of said electro-reactive members to supply a power current thereto; current generating means operable by the oscillations of said torsion member to generate a current whose frequency is determined by the frequency of vibration of said torsion member; and means connecting said generating means to said amplifier whereby said generated current will control the frequency of said power current to thereby synchronize the same with the frequency of vibration of said torsion member.

3. A torsional electric motor adapted to vibrate a variable load, which includes: a cylindrical torsion rod; means adjustable along the length of said torsion rod for clamping each end thereof in fixed position whereby the central portion of said rod can be twisted; a rocker arm fixed to the central portion of said torsion rod and adapted to be connected to a load to be vibrated; an electro-reactive member surrounding the central portion of said torsion rod and movable therewith; a stationary electro-reactive member surrounding said first electro-reactive member and adapted to cooperate therewith to twist said torsion rod when current is supplied to said electro-reactive members; power supply means connected to one of said electro-reactive members to supply a power current thereto; current generating means operable by the oscillations of said torsion rod to generate a current whose frequency is determined by the frequency of vibration of said torsion rod; and means connecting said generating means to said power supply means whereby said generated current will control the frequency of said power current to thereby synchronize the same with the frequency of vibration of said torsion rod.

4. A torsional electric motor adapted to vibrate a variable load, which includes: a cylindrical torsion member; means adjustable along the length of said torsion member for clamping an end thereof in fixed position whereby said member can be twisted; a rocker arm fixed to said torsion member and adapted to be connected to a load to be vibrated; an electro-reactive member surrounding said torsion member and movable therewith; a stationary electro-reactive member surrounding said first electro-reactive member and adapted to cooperate therewith to twist said torsion member when current is supplied to said electro-reactive members; power supply means connected to one of said electro-reactive members to supply a power current thereto; current generating means operable by the oscillations of said torsion member to generate a current whose frequency is determined by the frequency of vibration of said torsion member; and means connecting said generating means to said power supply means whereby said generated current will control the frequency of said power current to thereby synchronize the same with the frequency of vibration of said torsion member.

5. A torsional electric motor adapted to vibrate a variable load, which includes: a torsion member; means for clamping an end of said torsion member in fixed position whereby said member can be twisted; a rocker arm fixed to said torsion member and adapted to be connected to a load to be vibrated; an electro-reactive member surrounding said torsion member and movable therewith; a stationary electro-reactive member surrounding said first electro-reactive member and adapted to cooperate therewith to twist said torsion member when current is supplied to said electro-reactive members; power supply means connected to one of said electro-reactive members to supply a power current thereto; frequency control means whose frequency is determined by the frequency of vibration of said torsion member; and means connecting said frequency control means to said power supply means whereby the current from said frequency control means will control the frequency of said power current to thereby synchronize the same with the frequency of vibration of said torsion member.

6. A torsional electric motor adapted to vibrate a variable load, which includes: a torsion member; means for clamping said torsion member in fixed position whereby it can be twisted; a rocker arm fixed to said torsion member and adapted to be connected to a load to be vibrated; an electro-reactive member fixed to said torsion member and rotatable therewith; a stationary electro-reactive member surrounding said first electro-reactive member and adapted to cooperate therewith to twist said torsion member when current is supplied to said electro-reactive members; power supply means connected to one of said electro-reactive members to supply a power current thereto; frequency control means whose frequency is determined by the frequency of vibration of said torsion member; and means connecting said frequency control means to said power supply means whereby the current from said frequency control means will control the frequency of said power current to thereby synchronize the same with the frequency of vibration of said torsion member.

7. A torsional electric motor adapted to vibrate a variable load, which includes: electro-reactive means comprising a stator and a rotor concentrically mounted; means for supplying a power current to said electro-reactive means to cause said rotor to oscillate; a vibratory member connected to said rotor adapted to be vibrated thereby and to limit and reverse the rotation thereof; means adapted to connect said rotor to a load to be vibrated and to amplify the amplitude of the vibrations of said rotor imparted to said load; means operatively associated with said electro-reactive means for generating a current responsive to the oscillations of said rotor; and means connecting said generating means to said power supply means to control the frequency thereof and thereby synchronize the same with said vibratory member.

8. A torsional electric motor adapted to vibrate a variable load, which includes: a vibratory member mounted for oscillation; electro-reactive means comprising a stator and a rotor, said rotor being mounted on said vibratory member within said stator so that oscillation of said rotor will cause oscillation of said vibratory member, said member limiting the rotation of said rotor; means imparting the oscillations of said rotor and vibratory member to a load to be oscillated; means for varying the resonant frequency of said vibratory member; means for supplying a power current to said electro-reactive means; and electric means operable by the oscillation of said rotor for controlling the frequency of said power current to synchronize the same with said vibratory member.

9. A torsional electric motor adapted to vibrate a variable load, which includes: electro-reactive means comprising a stator and a rotor concentrically mounted; means for supplying a power current to said electro-reactive means to cause said rotor to oscillate; a vibratory member connected to said rotor adapted to be vibrated thereby and to limit and reverse the rotation thereof; means imparting the oscillations of said rotor and vibratory member to a load to be oscillated; means for supplying a power current to said electro-reactive means; and electric means operable by the oscillation of said rotor for controlling the frequency of said power current to synchronize the same with said vibratory member.

WILLIAM DUNCAN SWALLOW.